(12) United States Patent
Weller

(10) Patent No.: US 6,742,785 B1
(45) Date of Patent: Jun. 1, 2004

(54) CLAMPING DEVICE, IN PARTICULAR FOR THIN-WALLED HOLLOW PARTS

(75) Inventor: Hans-Michael Weller, Marbach (DE)

(73) Assignee: Hainbuch GmbH Spannende Technik, Marbach (DE)

(*) Notice: Subject to any disclaimer, the term of this patent is extended or adjusted under 35 U.S.C. 154(b) by 0 days.

(21) Appl. No.: 10/030,254
(22) PCT Filed: Jul. 4, 2000
(86) PCT No.: PCT/EP00/06270
§ 371 (c)(1), (2), (4) Date: May 6, 2002
(87) PCT Pub. No.: WO01/03870
PCT Pub. Date: Jan. 18, 2001

(30) Foreign Application Priority Data

Jul. 9, 1999 (DE) .......................................... 199 31 861

(51) Int. Cl.⁷ ................................................ B23B 31/40
(52) U.S. Cl. ..................................... 279/2.17; 269/48.1
(58) Field of Search .............................. 279/2.17, 2.1; 269/48.1; 242/571.8; 409/236

(56) References Cited

U.S. PATENT DOCUMENTS

| | | | | |
|---|---|---|---|---|
| 2,248,468 A | * | 7/1941 | Severson | 409/236 |
| 2,374,947 A | * | 5/1945 | Nicholson | 279/2.17 |
| 2,466,974 A | | 4/1949 | Stupakoff | |
| 2,647,701 A | * | 8/1953 | Cannard | 279/2.17 |
| 2,893,742 A | | 7/1959 | Froehner | |
| 2,955,830 A | | 10/1960 | Vilter | |
| 3,910,098 A | * | 10/1975 | Tailhardat | 269/48.1 |
| 4,422,590 A | | 12/1983 | Rathbone | |

FOREIGN PATENT DOCUMENTS

| | | |
|---|---|---|
| DE | 20 19 796 | 11/1970 |
| EP | 0 240 218 | 10/1987 |
| GB | 476 885 | 12/1937 |
| GB | 748 486 | 5/1956 |

* cited by examiner

Primary Examiner—Daniel W. Howell
(74) Attorney, Agent, or Firm—Foley & Lardner LLP

(57) ABSTRACT

The invention concerns a clamping device comprising a tensioning spindle whereof one end has a first axially fixed support surface and whereof the other end has a second axially mobile support surface and mobile relative to the first support surface through a clamping element. Between the two support surfaces on the tensioning spindle are one or several elastomer adapter sleeves.

24 Claims, 5 Drawing Sheets

CLAMPING DEVICE, IN PARTICULAR FOR THIN-WALLED HOLLOW PARTS

BACKGROUND

During the machining of hollow thin-walled parts, for example sleeves, which are machined only on their outer side but not on their inner side, there is the problem that the unmachined inner side used for clamping the part has shape errors, for example non-roundness, generally in conjunction with non-uniform wall thickness in the circumferential direction or deviations from the straight cylindrical shape, under certain circumstances likewise in conjunction with wall thickness differences in the longitudinal direction. If a conventional clamping device is used, the parts are deformed elastically when being clamped in, on account of these shape errors of their inner side. As a result, during the machining of the parts, the shape errors of the inner side are, so to speak, transferred to the outer side. Therefore, it is not possible to achieve either high shape accuracy or a very high surface quality, and in addition cylindricity can barely be maintained. Therefore, the lower the wall thickness and the greater the length of the parts, the less consideration is given to clamping such thin-walled parts at their two end faces since they then deviate more or less severely under the cutting forces. In addition, the parts then tend to oscillate, so that chatter marks are additionally produced.

SUMMARY OF THE INVENTION

The invention is based on the object of providing a clamping device with which, primarily, very thin-walled and relatively long parts can be clamped satisfactorily, largely independent of irregularities of their inner surface, and their outer side can be machined with the required accuracy and surface quality. According to a preferred embodiment of the present invention, a clamping device may have the following features: there is a clamping spindle (11) which, at least at one end, is provided with coupling elements (12) for coupling to the main spindle of a machine tool, the clamping spindle (11) has a first supporting face (17) at one end which is aligned axially and faces the other end of the clamping spindle (11) and which is arranged on the clamping spindle (11) such that it cannot be displaced in the axial direction; there is a second supporting face (21) on the clamping spindle (11) at the other end, which is aligned axially and faces the one end and which is arranged on a clamping element (19) which is guided on the clamping spindle (11) such that it can be displaced in the axial direction; there is a clamping device (15), by means of which the clamping element (19) with the second supporting face (21) can be displaced relative to the first supporting face (17) and can be fixed while applying an axial clamping force to the clamping spindle (11); there is at least one clamping sleeve (13), which is produced from an elastomer, whose inner diameter is matched to the outer diameter of the clamping spindle, whose end faces are matched to the first supporting face (17) and to the second supporting face (21); a clamping sleeve (13) has a plurality of supporting strips (23) on its outer side, which are produced from a metallic material, which are permanently connected to the clamping sleeve (13), which are arranged distributed uniformly on the circumference of the clamping sleeve (13) and whose outer side (29) forms a cylinder surface section in each case which is matched to the inner diameter of the part (24).

Similar problems also occur during the machining of the inner side of thin-walled parts whose outer side remains unmachined, in particular when the parts are relatively long. The invention is therefore also based on the object of providing a clamping device with which, primarily, very thin-walled and relatively long parts can be clamped satisfactorily, largely independent of irregularities of their outer surface, and their inner side can be machined with the required accuracy and surface quality. In a preferred aspect of the present invention, the clamping device (15) is formed by a longitudinal section (18) of the clamping spindle (11) that is provided with an external thread and by a clamping ring (19) matched thereto and having an internal thread.

The fact that, instead of rigid clamping jaws, a clamping sleeve made of an elastomer is used and is guided on a smooth cylindrical clamping spindle and is compressed axially via its two end faces means that the quasi hydraulic behavior of the material of the clamping sleeve is utilized in order to compensate to a large extent for irregularities in the clamping surface of the part. The fact that there are metallic supporting strips on the outer side of the clamping sleeve means that abrasion of the clamping sleeve is avoided when the parts are pushed on and pulled off and, as a result, a higher lifetime of the clamping device and, at the same time, constant clamping security and clamping accuracy are achieved.

The clamping device may be adapted more easily to different lengths of the parts. In a preferred aspect, there are a plurality of clamping sleeves (13), which are axially displaceably guided on the clamping spindle (11) and which are arranged between the first supporting face (17) on the clamping spindle (11) and the second supporting face (21) on the annular clamping element (19).

In another aspect, the axial frictional force which occurs when the clamping sleeves are being clamped, between the clamping sleeve and its seating surface on the clamping spindle or on the basic body, is distributed over a plurality of relatively short sections where said force is lower, individually and overall. As a result, the radial clamping force of the clamping device is also distributed, at least approximately uniformly, over the entire clamping length. The fact that the clamping sleeve is designed to be shorter than its supporting sleeve and does not project beyond the end faces of the supporting sleeve, and that the transmission of the axial clamping force is performed by interposed pressure rings prevents the compliant clamping sleeves being pressed into the initially open interspaces between the supporting sleeves and damaged in the process at the start of the clamping operation. In a preferred aspect, for each clamping sleeve (13) there is a supporting sleeve (14), which is produced from a material whose dimensional stability is greater than the dimensional stability of the clamping sleeve (13), whose inner diameter is matched to the outer diameter of the clamping spindle (11) and to whose outer diameter the inner diameter of the clamping sleeve (13) is matched; the supporting sleeves (14) may have a greater length than the clamping sleeves (13); each clamping sleeve (13) may be arranged on its supporting sleeve (14) in such a way that each of the end faces of the clamping sleeve (13) does not project in the axial direction beyond the end faces of the supporting sleeve (14); a pressure ring (25) may in each case be arranged between two successive clamping sleeves (13), whose inner diameter is matched to the outer diameter of the supporting sleeves (14) and whose outer diameter is at most equal to the inner diameter of the part (24).

In another aspect, when the clamping device is operated, the clamping sleeves can be compressed only by the differential amount of the length dimensions. This results in an exactly defined radial clamping force and, in addition, as a result overstressing both of the elastic clamping sleeves and of the thin-walled parts is avoided. In a preferred aspect, the sum of the axial extent of the pressure ring (25) and of the clamping sleeve (13) is greater by a predefined amount (26) than the axial extent of the supporting sleeve (14) of the latter.

In another aspect, the number of components of the clamping device is reduced. In a preferred aspect, each pressure ring (25) is detachably or non-detachably connected to the end of a supporting sleeve (14), preferably produced in one piece with it.

In another aspect, the radial diameter change of the clamping sleeve is disproportionate to the axial compression movement. The same applies to a configuration according to claim 8 and according to claim 18, respectively, a greater transmission factor between the radial diameter change and the axial compression movement being achieved. In a preferred aspect, on the clamping spindle, the seating face for each clamping sleeve is formed as the outer surface of a truncated cone, which widens toward the first supporting face, and the inner face of the clamping sleeve is matched to its seating face. In another preferred aspect, on the supporting sleeve (27), the seating face (28) for the clamping sleeve (31) is formed as the outer surface of a truncated cone, and the inner face (32) of the clamping sleeve (31) is matched to its seating face (28) on the supporting sleeve (27).

In another aspect, the clamping spindle or the base body can be supported at its second end, so that it gives way elastically to a lesser extent under the cutting forces and, as a result, the machining accuracy remains constant over the entire length of the part. In a preferred aspect, at its end facing away from the coupling elements (12), the clamping spindle (11) has an outer and/or an inner accommodation face (55; 56) for a supporting device (57).

In another aspect, a clamping device which can be produced and operated relatively simply is provided. In a preferred aspect, the clamping device (15) is formed by a longitudinal section (18) of the clamping spindle (11) that is provided with an external thread and by a clamping ring (19) matched thereto and having an internal thread.

BRIEF DESCRIPTION OF THE DRAWINGS

In the following text, the invention will be explained by using a number of exemplary embodiments illustrated in the drawings, in which.

DETAILED DESCRIPTION OF PREFERRED EMBODIMENTS

Figure 1:
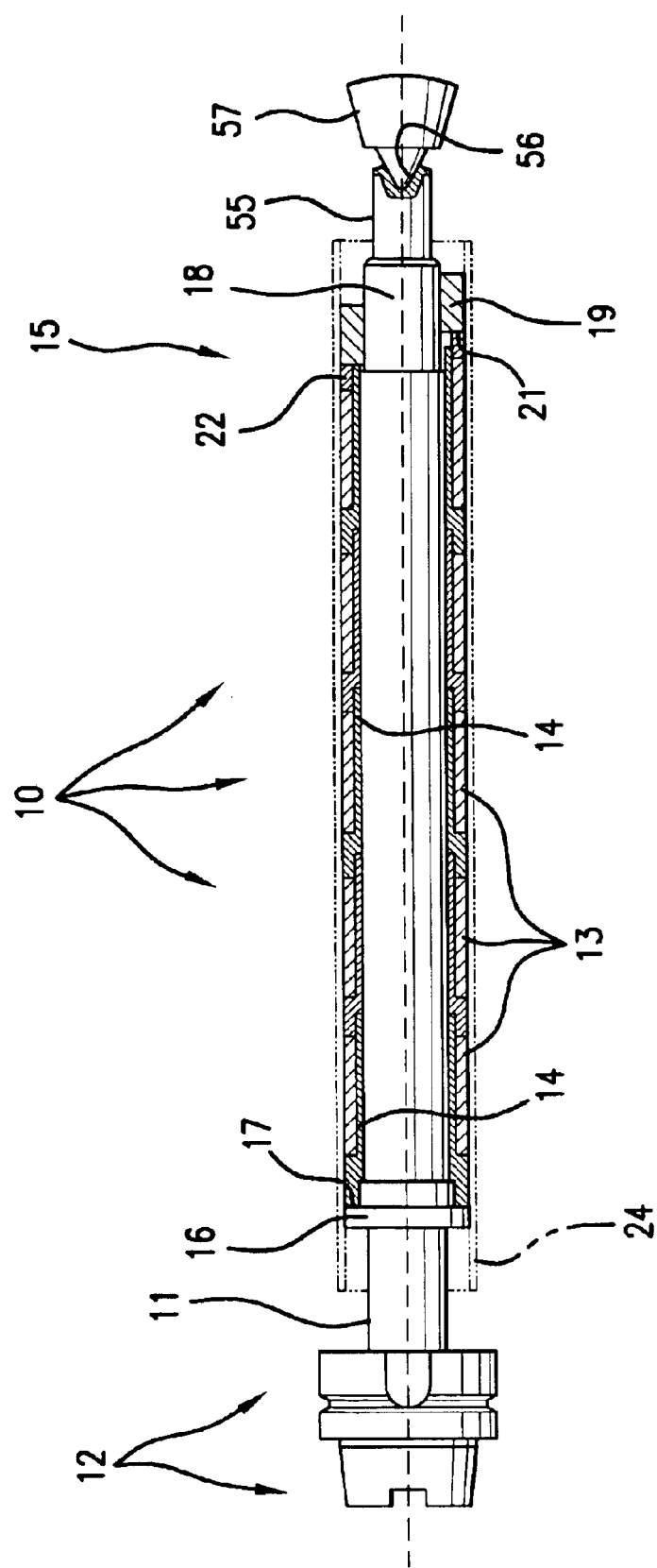
FIG. 1 shows a partly sectioned view of a first embodiment of a clamping device having a plurality of clamping sleeves for the external clamping of parts.

The clamping device 10 that can be seen from FIG. 1 has, as main subassemblies or main components, a clamping spindle 11 having coupling elements 12, a plurality of clamping sleeves 13 each having a supporting sleeve 14 and a clamping device 15. In the upper half, the clamping device 10 is illustrated in the clamped state and, in the lower half, in the unclamped state.

The clamping spindle 11 is an elongate, circularly cylindrical body which, at its end on the left in FIG. 1, is detachably or non-detachably connected to the coupling elements 12, by means of which it can be coupled to the main spindle of a machine tool. At its left-hand end, the clamping spindle 11 is provided with a collar 16, whose planar, annular end face facing away from the coupling elements 12 serves as a first axial supporting face 17 of the clamping sleeves 13. Arranged at the other end of the clamping spindle 11 is the clamping device 15. It is formed by a longitudinal section 18 provided with an external thread and a clamping ring 19 matched thereto and provided with an internal thread. The planar, annular end face of the clamping ring 19, facing the first supporting face 17, forms a second supporting face 21 for the clamping rings 13. For reasons of simpler manufacture and for improved possible adaptation to different adjustment stipulations, it may be expedient to insert a pressure ring 22 between the second supporting face 21 of the clamping ring 18 and the nearest clamping sleeve 13.

Figure 2:
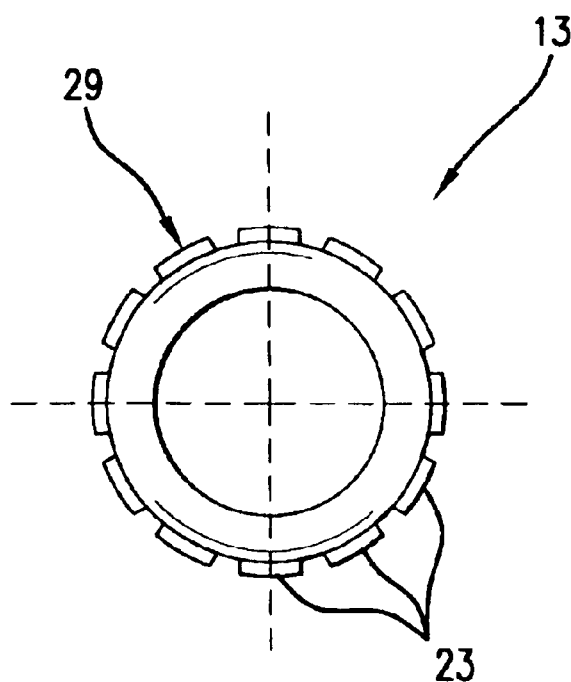
FIG. 2 shows an end view of a clamping sleeve.
Figure 3:
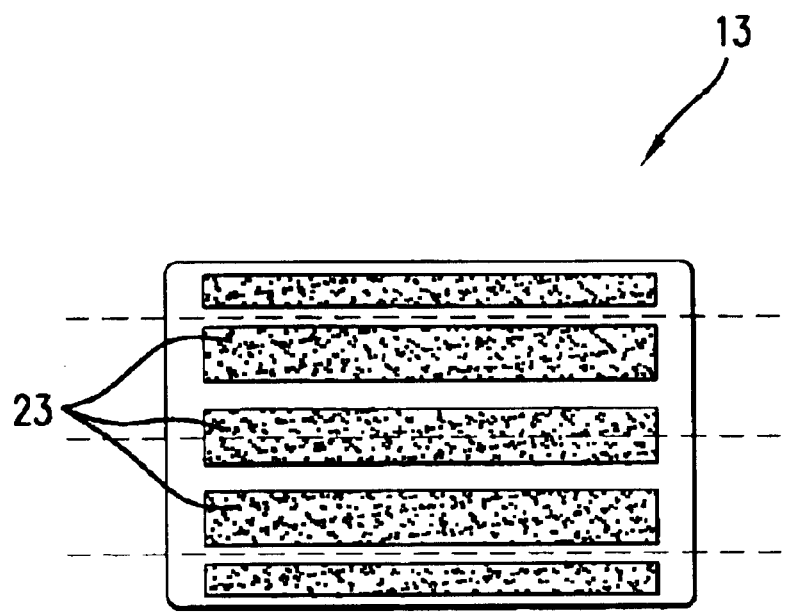
FIG. 3 shows a plan view of a clamping sleeve.
Figure 4:
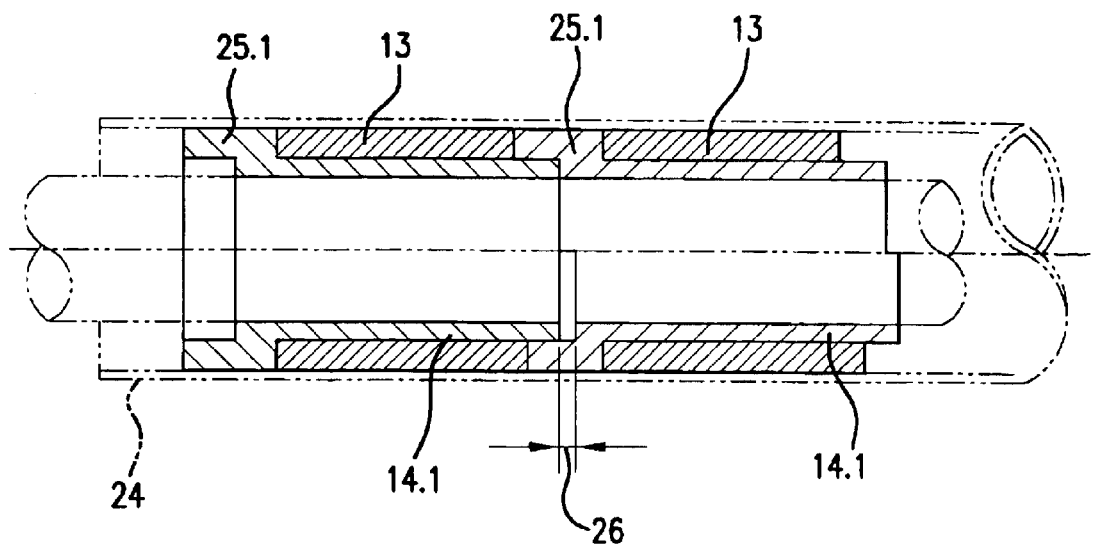
FIG. 4 shows an enlarged detail from FIG. 1 with two clamping sleeves.

As can be seen from FIG. 2 . . . FIG. 4, the clamping sleeves have the shape of a straight annular cylinder. They are produced from an elastomer. Arranged on their outer side are a plurality of supporting strips 23 of a metallic material. These supporting strips 23 are permanently connected to the clamping sleeve 13. They are aligned parallel to the axis and arranged distributed uniformly on the circumference of the clamping sleeve 13. The outer side of the supporting strips 23 forms a cylinder surface section which is matched to the inner diameter of the part 24 which, in FIG. 1 and to some extent in the other figures, is indicated dash-dotted.

The clamping sleeves 13 can be pushed directly onto the shaft of the clamping spindle 11. The inner diameter of the clamping sleeves 13 is then matched to the outer diameter of the clamping spindle 11. However, it is more expedient to push each clamping sleeve 13 onto a supporting sleeve 14. The supporting sleeves 14 are produced from a material whose dimensional stability is greater than the dimensional stability of the material of the clamping sleeve 13. Good sliding pairing between the material of the clamping sleeves 13 and that of the supporting sleeves 14 is advantageous. A metallic material is also considered for this purpose. The inner diameter of the supporting sleeves 14 is matched to the outer diameter of the clamping spindle 11. The outer diameter of the supporting sleeves 14 is matched to the inner diameter 13 of the clamping sleeves 13 or vice-versa. The supporting sleeves 14 have a greater length than the clamping sleeves 13. Each clamping sleeve 13 is arranged on its supporting sleeve 14 in such a way that each of the end faces of the clamping sleeve 13 does not project in the axial direction beyond the end face of the supporting sleeve 11.

Figure 5:
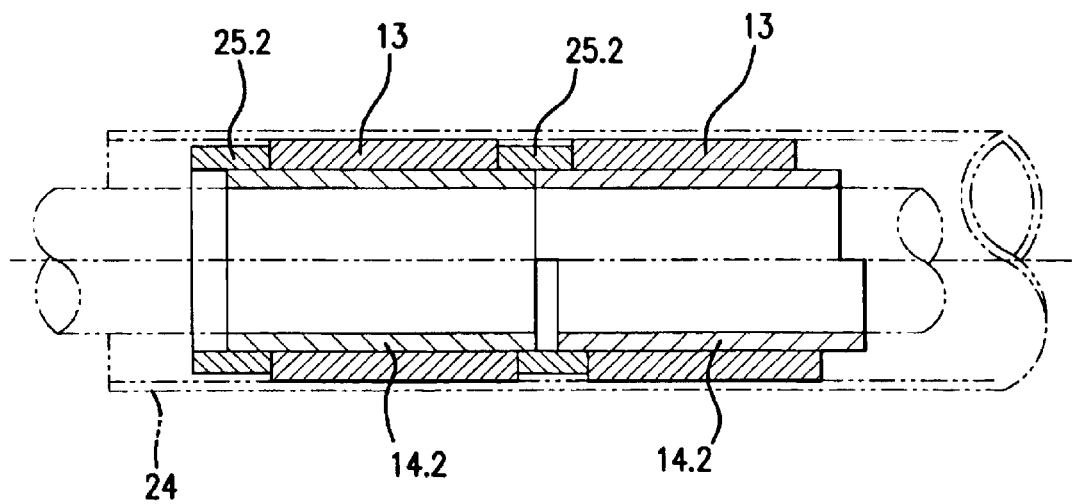
FIG. 5 shows an enlarged detail similar to FIG. 4 with two modified clamping sleeves.

FIGS. 4 and 5 reveal two different embodiments of the supporting sleeve 14, which for the purpose of distinction are designated supporting sleeve 14.1 (FIG. 4) and supporting sleeve 14.2 (FIG. 5), respectively.

In the respective lower half of the illustrations, the clamping sleeves 13 are shown in the unclamped state and, in the upper half, in the clamped state. In the unclamped state (lower half), the outer side of the clamping sleeve 13 and, in particular, that of its supporting strips 23 has a smaller spacing from the inner face of the part 24 which, for clarity, is illustrated greater than is actually the case. In the clamped state (upper half), the outer side of the clamping sleeves 13 and that of their supporting strips 23 rest on the inner side of the part 24. The radial clamping movement of the clamping sleeves 13 needed for this purpose is effected by means of axial compression of the clamping sleeves 13. Conversely, the radial unclamping of the clamping sleeves 13 is effected by means of axial relieving of the load on the clamping sleeves 14. Both are effected by the clamping device 15. In this arrangement, the clamping sleeves 13 are clamped in between the first supporting face 17 on the clamping spindle 11 and the second supporting face 21 on the clamping ring 18 (FIG. 1).

If the clamping sleeves 13 are not seated directly on the clamping spindle but each on a clamping sleeve 14, the clamping sleeves 13 are shorter than their supporting sleeves 14. The axial compression force of the clamping device 15 is then transmitted from one clamping sleeve 13 to the next by means of a pressure ring 25 in each case. In the embodiment according to FIG. 5, these pressure rings 25 are independent parts, as pressure rings 25.2, whose inner diameter is matched to the outer diameter of the associated supporting sleeves 14.2. Their outer diameter is at most equal to the inner diameter of the part 24. In the embodiment according to FIG. 4, the pressure rings 25.1 are permanently connected to the associated supporting sleeves 14.1, to be specific expediently produced in one piece with them.

Both in the embodiment according to FIG. 4 and in the embodiment according to FIG. 5, the clamping sleeves 13, their supporting sleeves 14 and the pressure rings 25 are expediently configured in such a way that, in the unclamped state of the clamping sleeves 13, the sum of the axial extent of the pressure ring 25 and of the clamping sleeve 13 is greater, by a predefined axial distance 26 (FIG. 4), than the axial extent of their supporting sleeve 24.

As a result, in the clamped state of the clamping sleeves 13, the supporting sleeves 14 form a stop which prevents the clamping sleeves 13 being compressed axially by the clamping device 15 beyond an extent matched to the relevant part 24 and, as a result, being widened radially.

Figure 6:
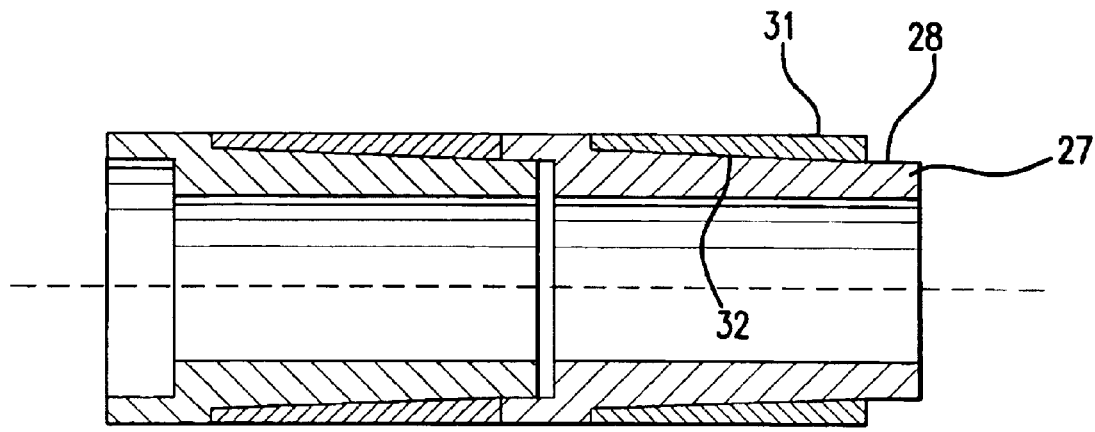
FIG. 6 shows an enlarged detail similar to FIG. 4 with two further modified clamping sleeves.
Figure 7:
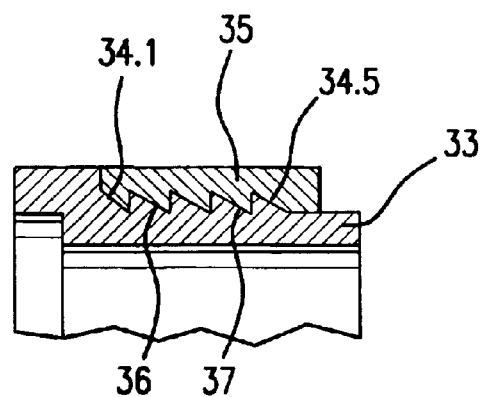
FIG. 7 shows a longitudinal section of a further embodiment of the clamping sleeves.

FIGS. 6 and 7 reveal two modified embodiments of clamping sleeves and their supporting sleeves.

On the supporting sleeve 27, the seating face 28 for the clamping sleeve 31 is formed as the outer surface of a truncated cone. The inner face 32 of the clamping sleeve 31 is matched to the seating face 28, that is to say it is formed as a hollow outer surface of a truncated cone.

In the embodiment according to FIG. 7, on the supporting sleeve 33 the seating face 34 for the clamping sleeve 35 is formed by a plurality of longitudinal sections 34.1 . . . 34.5 of the outer surface of a truncated cone. The inner face 36 of the clamping sleeve 35 is formed by longitudinal sections, matched thereto, of the outer surface of a hollow truncated cone. The seating-face sections 34.1 . . . 34.5 follow one another axially in the same alignment. They adjoin one another via an annular planar interface 37 in each case.

In the embodiment according to FIG. 7, the cone angle of the seating faces 34 and the inner face 36 is considerably greater than in the embodiment according to FIG. 6. As a result, during a predefined axial compression travel, the radial expansion of the clamping sleeve 35 is greater than in the clamping sleeve 31.

Figure 8:
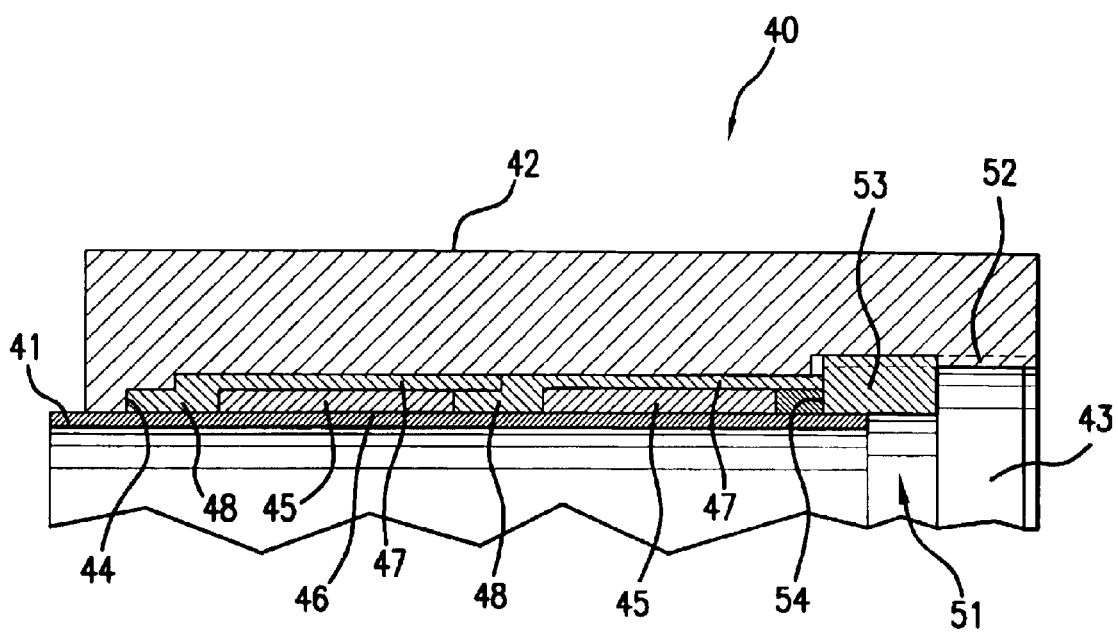
FIG. 8 shows a longitudinal section, shown as a detail, of a second design of the clamping device having a plurality of clamping sleeves for the external clamping of parts.

FIG. 8 reveals a clamping device 40 for the external clamping of thin-walled sleeve-like parts 41, which are machined on their inner side. The coupling elements for coupling to a machine tool are not illustrated.

The clamping device 40 has a hollow base body 42 having the approximately hollow cylindrical inner space 43. At one end of the inner space 43, on the base body 42, there is a first supporting face 44 which is aligned axially and faces the other end.

Arranged in the inner space 43 of the base body 42 are a plurality of clamping sleeves 45, which are produced from an elastomer. The inner face 46 of the clamping sleeves 45 forms the clamping face for the part 41. It is provided with a number of supporting strips, as is the case in the clamping face on the outside of the clamping sleeves 13 of the clamping device 10. The clamping sleeves 45 are each seated in a supporting sleeve 47, which is produced in one piece together with a pressure ring 48 in each case. The axial compression required for the radial clamping movement of the clamping sleeves 45 is effected by a clamping device 51, which is formed by a longitudinal section provided with an internal thread on the inner face of the basic body 42 and by an annular clamping ring 53 screwed into the latter.

In the case of the clamping device 40, the operative direction of its parts in the radial direction is opposite to that in the corresponding parts of the clamping device 10 (FIG. 1). Taking account of this fact, their parts largely correspond to one another in terms of construction and operating mode. To this extent, reference is made to the description of this clamping device 10, which also includes the modifications according to FIG. 5 . . . FIG. 7.

As is indicated on the right in FIG. 1, in particular in the case of parts of greater length and/or lower diameter and smaller wall thickness, and in the case of an appropriately designed clamping device, it may be expedient to clamp the clamping device not only at the end having the coupling elements for the connection to the main spindle of a machine tool but also to support it at the opposite end. This can be done in different ways, for example via a supporting face located on the outside and/or via one located on the inside.

Outside the clamping device 15, the clamping spindle 11 has both the outer cylindrical supporting face 55 and, in its end face, the centering hole 56 as an inner supporting face. A co-rotating lathe center 57 acts together with said centering hole 56. For the outer supporting face 55, a freely co-rotating or a driven chuck can be used.

What is claimed is:

1. A clamping device for clamping a part, comprising:
   a clamping spindle; and
   at least one clamping sleeve,
   wherein said clamping spindle comprises:
      coupling elements for coupling said clamping spindle to a main spindle of a machine tool;
      a first supporting face at one end which is aligned axially and faces the other end of the clamping spindle and which is arranged on the clamping spindle such that it cannot be axially displaced;
      a clamping element axially displaceably arranged on the clamping spindle at the other end; and
      a second supporting face which is aligned axially and faces the one end and which is arranged on the clamping element,
   wherein said at least one clamping sleeve is produced from an elastomer,
   wherein said at least one clamping sleeve has end faces that are matched to the first supporting face and to the second supporting face,
   wherein said at least one clamping sleeve has a plurality of supporting strips on its outer side, wherein said plurality of supporting strips are produced from a metallic material, are permanently connected to the clamping sleeve, are arranged distributed uniformly on a circumference of the clamping sleeve, and whose outer side forms a cylinder surface section which is matched to an inner diameter of the part.

2. The clamping device as claimed in claim 1, further comprising a plurality of clamping sleeves which are axially displaceably guided on the clamping spindle and which are arranged between the first supporting face on the clamping spindle and the second supporting face on the clamping element.

3. The clamping device as claimed in claim 2, wherein for each clamping sleeve there is a supporting sleeve which is produced from a material whose dimensional stability is greater than the dimensional stability of the clamping sleeve, whose inner diameter is matched to an outer diameter of the clamping spindle, whose outer diameter is matched to an inner diameter of the clamping sleeve, and whose length is greater than the clamping sleeves, wherein each clamping sleeve is arranged on its supporting sleeve in such a way that each of the end faces of the clamping sleeve does not axially project beyond end faces of the supporting sleeve, wherein the clamping device further comprises a pressure ring in each case arranged between two adjacent clamping sleeves, wherein said pressure ring has an inner diameter that is matched to the outer diameter of the supporting sleeves and an outer diameter that is at most equal to the inner diameter of the part.

4. The clamping device as claimed in claim 3, wherein a sum of an axial length of the pressure ring and of the clamping sleeve is greater by a predefined amount than an axial length of the supporting sleeve of the latter.

5. The clamping device as claimed in claim 3, wherein each pressure ring is connected to an end of a supporting sleeve.

6. The clamping device as claimed in claim 1, further comprising, on the clamping spindle, a seating face for each clamping sleeve that is formed as the outer surface of a truncated cone, which widens toward the first supporting face, wherein an inner face of the clamping sleeve is matched to its seating face.

7. The clamping device as claimed in claim 3, further comprising, on the supporting sleeve, a seating face for each clamping sleeve that is formed as the outer surface of a truncated cone, wherein an inner face of the clamping sleeve is matched to its seating face on the supporting sleeve.

8. The clamping device as claimed in claim 3, further comprising, on the supporting sleeve, a seating face for the clamping sleeve that is formed by a plurality of longitudinal sections of the outer surface of a truncated cone which follow one another axially in the same alignment and which adjoin one another via an interface in each case.

9. The clamping device as claimed in claim 1, wherein, at its end facing away from the coupling elements, the clamping spindle has an accommodation face configured to accommodate a supporting device.

10. The clamping device as claimed in claim 1, wherein the clamping spindle is provided with an external thread and the clamping element comprises a clamping ring having an internal thread matched to the external thread.

11. A clamping device for clamping a part, comprising:

an at least partly hollow base body; and at least one clamping sleeve, wherein said base body comprises:

coupling elements for coupling said base body to a main spindle of a machine tool;

a first supporting face at one end of an inner space of the base body which is aligned axially and faces the other end of the base body and which is arranged on the base body (42) so as to be nondisplaceable axially;

a clamping element axially displaceably arranged on the base body at the other end;

a second supporting face at the other end of the inner space of the base body which is aligned axially and faces the one end and which is arranged on the clamping element, wherein said at least one clamping sleeve is produced from an elastomer, wherein said at least one clamping sleeve has end faces that are matched to the first supporting face and to the second supporting face on the base body, wherein said at least one clamping sleeve has a plurality of supporting strips on its inner side, wherein said plurality of supporting strips are produced from a metallic material, are permanently connected to the clamping sleeve, are arranged distributed uniformly on a circumference of the clamping sleeve, and whose inner side forms a cylinder surface section which is matched to an outer diameter of the part.

12. The clamping device as claimed in claim 11, further comprising a plurality of clamping sleeves which are axially displaceably guided in the inner space of the base body and which are arranged between the first supporting face on the base body and the second supporting face on the clamping element.

13. The clamping device as claimed in claim 12, wherein for each clamping sleeve there is a supporting sleeve which is produced from a material whose dimensional stability is greater than the dimensional stability of the clamping sleeve, whose outer diameter is matched to an inner diameter of the inner space of the base body, whose inner diameter is matched to an outer diameter of the clamping sleeve, and whose length is, greater than the clamping sleeves, wherein each of the clamping sleeves is arranged on its supporting sleeve in such a way that each of the end faces of the clamping sleeve does not axially project beyond the end face of its supporting sleeve, wherein the clamping device further comprises a pressure ring in each case arranged between each two adjacent clamping sleeves, wherein said pressure ring has an outer diameter that is matched to the inner diameter of the supporting sleeves and an inner diameter that is at least equal to the outer diameter of the part.

14. The clamping device as claimed in claim 13, wherein a sum of an axial length of the pressure ring and the clamping sleeve is greater by a predefined amount than an axial length of the supporting sleeve.

15. The clamping device as claimed in claim 13,
wherein each pressure ring is connected to an end of a supporting sleeve.

16. The clamping device as claimed in claim 11,
further comprising on the base body, a seating face for each clamping sleeve that is formed as the outer surface of a hollow cone, which tapers toward the first supporting face,
wherein an outer face of the clamping sleeve is matched to its seating face on the base body.

17. The clamping device as claimed in claim 13,
further comprising, on the supporting sleeve, a seating face for each clamping sleeve that is formed as the outer surface of a hollow cone,
wherein an outer face of the clamping sleeve is matched to its seating face on the supporting sleeve.

18. The clamping device as claimed in claim 13,
further comprising, on the supporting sleeve, a seating face for the clamping sleeve that is formed by a plurality of longitudinal sections of the outer surface of a hollow cone which follow one another axially in the same alignment and which adjoin one another via an interface in each case.

19. The clamping device as claimed in claim 11,
wherein, at its end facing away from the coupling elements, the base body has an outer accommodation face configured to accommodate a supporting device.

20. The clamping device as claimed in claim 11,
wherein the base body is provided with an internal thread and the clamping element comprises a clamping ring having an external thread matched to the internal thread.

21. The clamping device as claimed in claim 1, wherein said at least one clamping sleeve has an inner diameter that is matched to an outer diameter of the clamping spindle.

22. The clamping device as claimed in claim 5, wherein said pressure ring is produced in one piece with said supporting sleeve.

23. The clamping device as claimed in claim 11, wherein said at least one clamping sleeve has an outer diameter that is matched to an inner diameter of the base body.

24. The clamping device as claimed in claim 15, wherein said pressure ring is produced in one piece with said supporting sleeve.

\* \* \* \* \*